(12) United States Patent
Mikhael et al.

(10) Patent No.: US 7,157,117 B2
(45) Date of Patent: Jan. 2, 2007

(54) FUNCTIONALIZATION OF POROUS MATERIALS BY VACUUM DEPOSITION OF POLYMERS

(75) Inventors: Michael G. Mikhael, Tucson, AZ (US); Angelo Yializis, Tucson, AZ (US)

(73) Assignee: Sigma Laboratories of Arizona, LLC, Tucson, AZ (US)

( * ) Notice: Subject to any disclaimer, the term of this patent is extended or adjusted under 35 U.S.C. 154(b) by 0 days.

(21) Appl. No.: 10/830,608

(22) Filed: Apr. 23, 2004

(65) Prior Publication Data

Related U.S. Application Data

(63) Continuation-in-part of application No. 10/465,399, filed on Jun. 19, 2003.
(60) Provisional application No. 60/465,719, filed on Apr. 25, 2003, provisional application No. 60/391,864, filed on Jun. 26, 2002.

(51) Int. Cl.
  *C23C 16/00* (2006.01)
(52) U.S. Cl. .............. 427/255.6; 427/294; 427/384
(58) Field of Classification Search ............. 427/255.6, 427/248.1, 384, 294
See application file for complete search history.

(56) References Cited

U.S. PATENT DOCUMENTS

| | | | |
|---|---|---|---|
| 6,218,004 B1 * | 4/2001 | Shaw et al. | 428/336 |
| 6,497,780 B1 * | 12/2002 | Carlson | 156/230 |
| 6,599,559 B1 * | 7/2003 | McGee et al. | 427/2.24 |
| 2004/0028931 A1 * | 2/2004 | Bletsos et al. | 428/500 |

* cited by examiner

*Primary Examiner*—Bret Chen
(74) *Attorney, Agent, or Firm*—Antonio R. Durando

(57) ABSTRACT

A porous substrate is pretreated in a plasma field and a functionalizing monomer is immediately flash-evaporated, deposited and cured over the porous substrate in a vacuum vapor-deposition chamber. By judiciously controlling the process so that the resulting polymer coating adheres to the surface of individual fibers in ultra-thin layers (approximately 0.02–3.0 μm) that do not extend across the pores in the material, the porosity of the porous substrate is essentially unaffected while the fibers and the final product acquire the desired functionality. The resulting polymer layer is also used to improve the adherence and durability of metallic and ceramic coatings.

18 Claims, 7 Drawing Sheets

FUNCTIONALIZATION OF POROUS MATERIALS BY VACUUM DEPOSITION OF POLYMERS

RELATED APPLICATION

This application is based on U.S. Provisional Application Ser. No. 60/465,719, filed Apr. 25, 3003, and is a continuation-in-nart application of copending U.S. Ser. No. 10/465,399, filed Jun. 19, 2003, which is based on and claims the priority of U.S. Provisional Application No. 60/391,864, filed Jun. 26, 2002.

BACKGROUND OF THE INVENTION

1. Field of the Invention

This invention is related in general to the functionalization of the surface of materials for the purpose of improving their properties for particular applications. In particular, it pertains to a combined plasma-treatment/vapor-deposition process for functionalizing paper, membranes, and other woven and non-woven porous materials.

2. Description of the Related Art

The term "functionalization" and related terminology are used in the art and herein to refer to the process of treating a material to alter its surface properties to meet specific requirements for a particular application. For example, the surface energy of a material may be treated to render it particularly hydrophobic or hydrophilic as may be desirable for a given use. Thus, surface functionalization has become common practice in the manufacture of many materials because it adds value to the end product. In order to achieve such different ultimate results, functionalization may be carried out in a variety of ways ranging from wet chemistry to various forms of vapor deposition, vacuum metallization and sputtering.

Textiles, non-woven products and paper substrates are fiber-based porous materials with inherent properties derived from the nature of the fibers. Synthetic and natural fibers (for example, polypropylene, nylon, polyethylene, polyester, cellulosic fibers, wool, silk, and other polymers and blends) can be shaped into different products with a great range of mechanical and physical properties. In addition, the porosity of these materials usually serves a necessary function, such as gas and/or liquid permeation, particulate filtration, liquid absorption, etc. Therefore, any subsequent treatment designed to further modify the chemical properties of the fibers by appropriately functionalizing them must be carried out, to the extent possible, without affecting the porosity of the material. This has heretofore been virtually impossible when such functionalization results from the deposition of polymers.

A variety of wet chemical processes have been used traditionally to treat with polymers and functionalize fibers that are otherwise inert or have limited surface functionality. These processes involve the immersion of the fibrous material in liquids or fluid foams designed to coat individual fibers and impart specific functionalities while retaining the material's porosity and ability to breathe. In spite of the many claims made in commercial products, though, it is clear that such wet-chemistry processes at best materially reduce the porosity of the substrate or, in the worst cases, essentially plug the interstices between fibers. Therefore, the functionalization of porous materials by wet-chemistry polymer deposition has produced the desired results in terms of surface functionality, but with the attendant serious deterioration of the mechanical characteristics of the underlying porous substrate.

Thus, prior-art processes for functionalizing porous materials by coating the fibers with a polymer film have produced unsatisfactory results because of loss of porosity. In addition, these solvent-based and water-based processes for woven and non-woven fabrics, paper and other porous materials (like open- and closed-cell plastic foams) have been increasingly facing environmental challenges and constraints that result in higher end-product costs. In some cases, producers have actually withdrawn from the market coatings that present potential health hazards, such as the fluoro and chloro monomer materials used to functionalize products for hydrophobic/oleophobic and biocide properties, respectively.

Therefore, there is a pressing need for new coating technologies that are suitable for porous materials, are safe to implement, do not utilize solvents, and do not effect the mechanical and functional properties of the porous substrate. While polymers applied by vacuum deposition have been used successfully in the art to impart particular functional properties to non-porous, non-permeable substrates, no attempt was historically made to so functionalize porous materials because the vacuum deposition process was believed to be likely to exacerbate the pore plugging problem.

For example, the vacuum deposition of a polymer coating by flash evaporation of a monomer and its subsequent polymerization by radiation curing in a vacuum chamber has been used widely with a variety of monomers, such as free-radical polymerizable acrylates, cationic polymerizable epoxies and vinyl monomers, to control the surface energy of the resulting products and introduce desirable characteristics. Without limitation, these include hydrophobicity, oleophobicity, hydrophilicity, oleophilicity, fire resistance, biocidicity, color, anti-stain, antistatic, and sensor properties. In all cases, the substrate is exposed to a dense fog of vaporized monomer under conditions that cause its immediate condensation and curing on the substrate's surface. Therefore, it stood to reason to believe that these conditions would favor the accumulation of monomer droplets in the pores of a porous substrate and cause it to become impermeable. This invention is based on the surprising discovery that, when appropriately controlled, vacuum deposition can be use successfully to functionalize porous materials while retaining their permeability properties.

BRIEF SUMMARY OF THE INVENTION

In view of the foregoing, this invention is directed at a process that is suitable for functionalizing a broad range of porous substrates, including synthetic and natural fabrics, fibers and non-woven materials. Because of the fibrous nature of these substrates and their general commercial uses, the invention is directed particularly at maintaining the breathability of the materials, providing durability in the coatings and prolonged resistance to washing and cleaning, and selectively treating one or both sides of the fabric material. The invention also aims at a process that is compatible with the use of existing equipment and with the application of other coating layers, including various additives and catalysts currently utilized in the art.

Therefore, according to one aspect of the invention, a porous substrate is pretreated in a plasma field and a functionalizing monomer is immediately flash-evaporated, deposited and cured over the substrate in a vacuum vapor-deposition chamber. We discovered that it is possible to control the process so that the resulting polymer coating adheres to the surface of individual fibers in ultra-thin layers (approximately 0.02–3.0 µm, depending on the size of the pores) that do not extend across the pores in the material. As a result, the porosity of the substrate is essentially unaffected while the fibers and the final product acquire the desired functionality.

The vapor deposition of metals and/or ceramics has also been used in the art to produce a great variety of functionalized products. For example, metal-coated substrates provide increased reflectivity and indium-titanium-oxide (ITO) coated materials provide electrical conductivity. Metal, ceramic and polymer layers have been deposited on non-porous substrates separately or in combination to produce different effects, as may be desirable for particular applications.

Therefore, according to another aspect of the invention, multiple layers of polymeric and metallic and/or ceramic materials are vapor deposited in a single process to impart additional functional properties to the porous substrate. For example, while it has been known to deposit metal layers directly on fabrics in order to add reflectivity, the resulting coated products have exhibited low durability and poor resistance to abrasion (i.e., the metal particles do not form an even layer over the microscopically rough fiber surfaces and metal flakes tend to separate from the fabric). According to the invention, a polymer layer is first deposited to produce a smooth thin layer over the fibers and a metal layer is then deposited over the resulting improved substrate. This process yields a smoother fiber surface for receiving the metal deposition, which prevents cracking and separation of the outer metal layer. If necessary, depending on the intended use, an additional polymeric protective layer can yet be added over the metallic film without materially affecting the overall permeability of the fabric.

As detailed below, similar advantages are obtained by combining polymers with ceramics, which also tend to break up and separate from the substrate when deposited directly over fibers. Various other purposes and advantages of the invention will become clear from its description in the specification that follows and from the novel features particularly pointed out in the appended claims. Therefore, the invention consists of the features hereinafter illustrated in the drawings, fully described in the detailed description of the preferred embodiments and particularly pointed out in the claims.

DESCRIPTION OF THE PREFERRED EMBODIMENTS OF THE INVENTION

Figure 1:
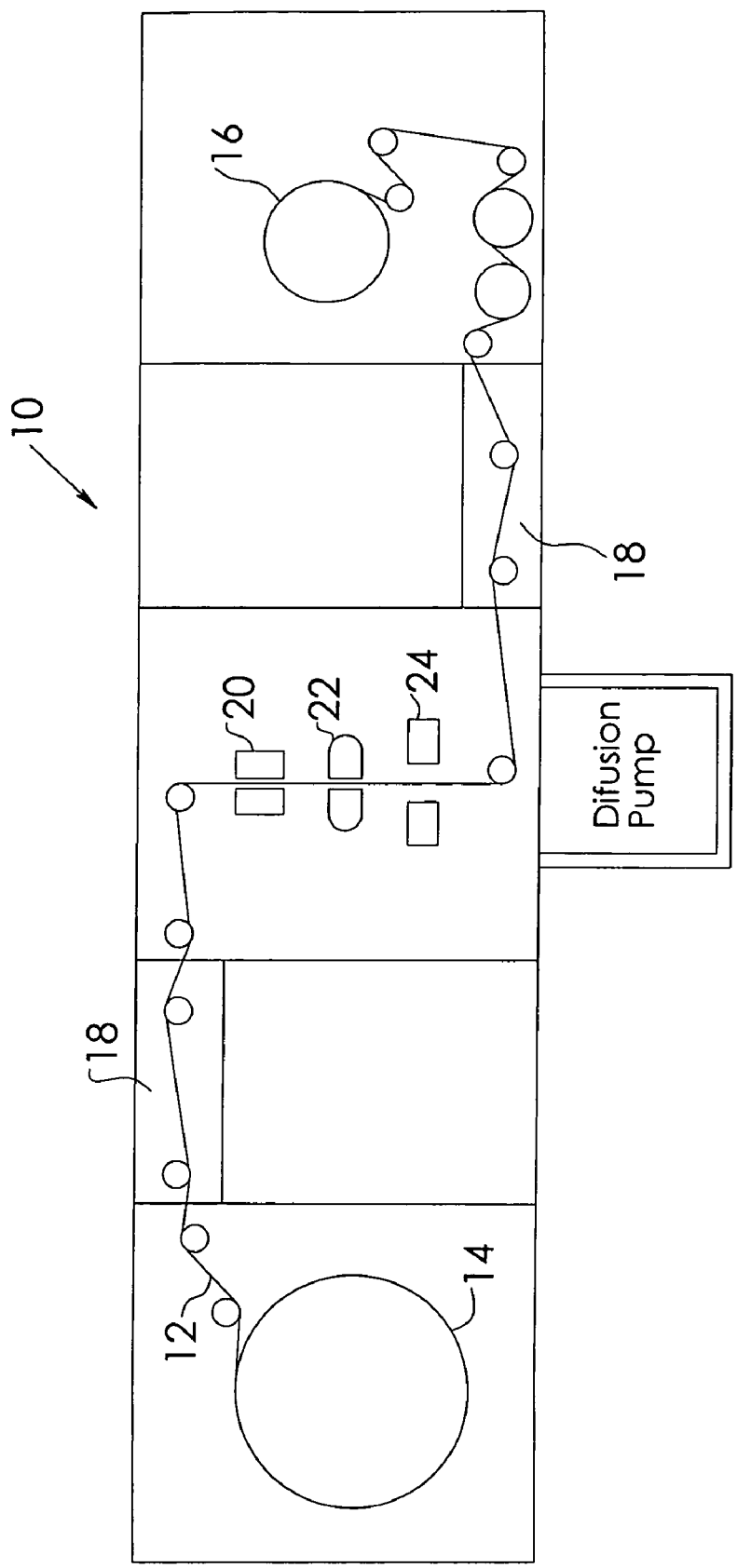
FIG. 1 is a schematic representation of a modified vacuum chamber according to the invention.

The invention lies in the discovery that utilizing the process of vacuum deposition to functionalize a porous substrate with a polymeric film makes it possible to control the thickness of the deposited layer and avoid the problem of pore plugging encountered when functionalization is carried out by wet chemistry. The invention also lies in the discovery that coating individual fibers of a porous substrate with a thin polymer layer produces a surface that is better adapted for receiving the subsequent deposition of metal or ceramic layers. Surprisingly, when deposited over an underlying polymer layer already used to coat individual fibers, metals and ceramics are found to be much more resistant to breakage and separation than heretofore possible using prior-art deposition techniques. Without limitation, porous substrates to which this invention applies consist of polypropylene, polyethylene, fluoro-polymers, polyester, nylon, rayon, paper, wool, cotton, glass fibers, carbon fibers, cellulose based fibers, and metals.

For the purposes of this disclosure, the term "porous" is used in a macroscopic sense with reference to any substrate through which fluids can easily permeate under normal conditions. These include, for example, paper, textiles, woven or non-woven fabrics, solid foams, membranes and similar materials exhibiting permeability properties typically associated with these products. "Porous" is not intended to cover materials which, though they exhibit structural porosity, are not used functionally as permeable substrates. The term "condensation" refers to a phase-change process from gas to liquid (and subsequently solid) obtained upon contact with a surface having a temperature lower than the dew point of the gas at a given operating pressure. For the purposes of the invention, such a surface is the substrate subjected to vapor deposition which has been either pre-chilled or is in contact with a cold drum in the vacuum chamber. Finally, the term "monomer" is intended to include also oligomers and blends of monomers or oligomers capable of flash evaporation in a vacuum chamber.

In its preferred embodiment, the invention is practiced by first pretreating the porous substrate in a plasma field and then immediately subjecting it to the deposition of a thin layer of vaporized monomer in a vacuum deposition process under conditions that prevent the formation of condensate blocking the pores of the substrate. The monomer film is subsequently polymerized by exposing it to an electron-beam field or other radiation-curing process. The monomer is flash-evaporated and condensed on the porous substrate in conventional manner but, in order to retain the structural porosity and the related functional properties of the substrate, the residence time of the substrate within the deposition zone of the vacuum chamber is controlled to ensure that a very thin film is deposited relative to the size of the pores in the substrate. Thus, monomer penetration within the porous structure of the substrate produces a coating of individual fibers (or pore walls) without sealing the openings between fibers. This is achieved by controlling the vapor density and the speed of the moving substrate to limit the thickness of the coating to about 0.02 to 3 µm.

Vacuum plasma has been used for some time to pretreat as well as to finish treating products of vapor deposition processes. Pretreatment is used to clean and activate the substrate. These functions are attributed to the plasma ablation of contaminants and the generation of free radical and ionic species, respectively. Plasma finishing treatment has been shown to have chemical and physical effects that are useful in improving the outcome of vapor-deposition processes. For example, plasma for hydrocarbon gases and other functional monomer vapors that polymerize on the vapor-deposited surface may be added (plasma grafting and polymerization) to produce specific results, such as hydrophilic and hydrophobic surfaces.

We found that, when coupled with the vacuum deposition of monomers over fibrous substrates, plasma pretreatment produces the additional unexpected effect of preventing the formation of monomer droplets (an effect referred to as "beading" in the art) over the substrate. This discovery is particularly advantageous to prevent the plugging of pores in fabrics, paper and other porous materials being coated with functionalizing monomers. Therefore, the combination of plasma pretreatment with vapor deposition is much preferred in carrying out the invention.

As illustrated in FIG. 1, in order to practice the invention a conventional vacuum chamber 10 is modified to enable the serial plasma-field pretreatment, vapor deposition, and radiation curing of a porous substrate in a continuous process. Typically, the porous substrate 12 (like paper or fabric) is processed entirely within the vacuum chamber 10 while being spooled continuously between a feed reel 14 and a product reel 16. The substrate 12 is first passed through a cold compartment 18 to chill it to a temperature sufficiently low to ensure the subsequent cryocondensation of the monomer vapor. The substrate is then passed through a plasma pretreatment unit 20 and immediately thereafter (within no more than a few seconds, preferably within milliseconds) through a flash evaporator 22, where it is exposed to the monomer vapor for the deposition of a thin liquid film over the cold substrate. The monomer film is then polymerized by radiation curing through exposure to an electron beam unit 24 and passed downstream through another (optional) cooled compartment 18. As is well known in the art, instead of pre-chilling the substrate 12 being processed, a rotating cold drum (typically kept at −20° C. to 30° C.) in contact with the substrate past the evaporator 22 may be used to effect the condensation of the monomer vapor.

We found that the monomer feed to the evaporator unit 22 and the speed of the spooling substrate can be judiciously tailored to ensure the three-dimensional coverage of the porous structure of the substrate 12 while limiting the thickness of the film deposited over the substrate fibers. For example, feeding a fluoro-acrylate monomer at a rate of about 40 ml/minute to the flash evaporator 22 and moving the substrate 12 (1.2 meter wide) through the chamber at a speed of about 100 meters per minute produces the formation of a substantially uniform film about 0.5-µm thick over the polypropylene fibers of a typical filter medium with pores about 20–40 µm wide. As a result, the porosity of the medium is not significantly affected, but the material is thoroughly functionalized to exhibit oleophobic properties.

Figure 2:
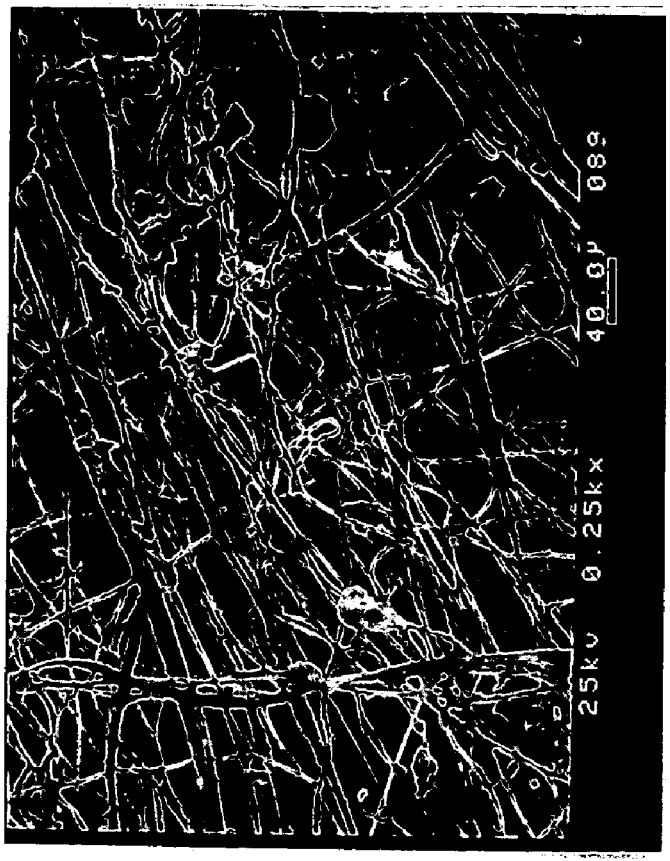
FIG. 2 is a scanning electron microscope (SEM) picture of an uncoated non-woven polypropylene fabric used to produce an oleophobic filter medium.
Figure 3:
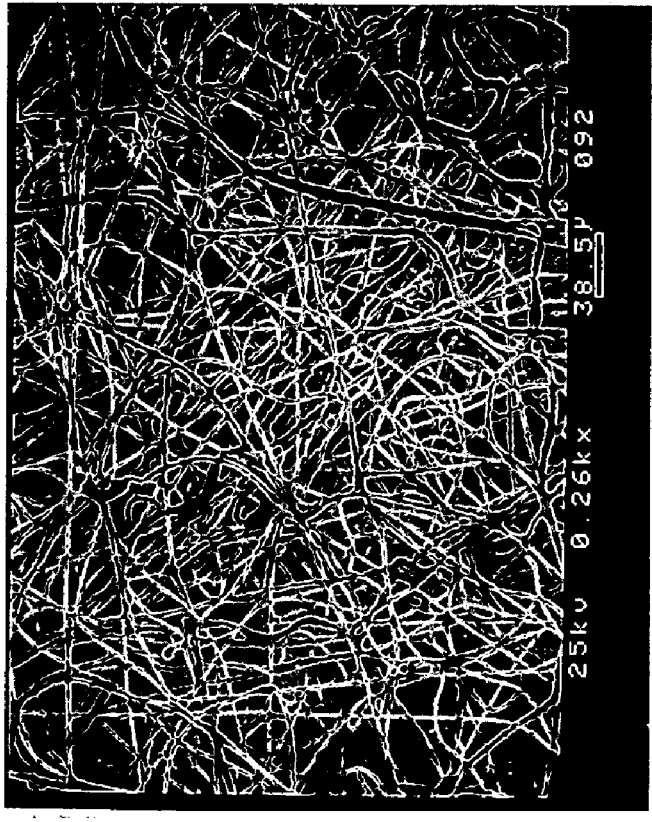
FIG. 3 is an SEM picture of the same non-woven polypropylene fabric of FIG. 2 after coating by monomer vacuum deposition according to the invention.

FIGS. 2 and 3 illustrate SEM pictures of such a non-woven filter medium before and after coating, respectively, according to the invention. The micrographs show no evidence of polymer obstruction between the fibers and, in fact, air permeation tests showed no significant difference between the two samples. This resulted from the conformal (i.e., shaped to conform to the structure of individual fibers) deposition of the liquid monomer from a vapor phase state over the surface of the fibers, in contrast to conventional liquid-based methods that exhibit very limited levels of conformal deposition. The smooth and pliable nature of the polymer surface covering each fiber after vapor deposition is believed to be the reason for the greater adhesion and resistance to breakage of metallic and/or ceramic layers whey they are further used to cover the fibers.

In general, we found that thin polymer coatings (0.1 µm or less) designed to alter the chemical functionality of a porous substrate have no significant effect on gas permeability. Thicker coatings, designed to provide physical protection against wear and tear, have only a minor effect on breathability. As illustrated in Table 1 below for three different fabrics treated with the process of the invention, air permeability appears to be (and remain after treatment) simply a function of the weight of the material (i.e., the coarseness of the weave), rather than of the polymer coating. Each material in the table (A-cotton, B-polyester, C-wool) consisted of a woven fabric coated with as much as 2–3 µm of vacuum deposited acrylate polymer prior to metallization. This relatively thick polymer coating enhanced the abrasion resistance and washability properties of the metallized fabrics but did not materially affect the permeability of the material.

TABLE 1

| Material | Basis weight (OZ/Y$^2$) | Air permeability (CFM/M$^2$) |
| --- | --- | --- |
| A-uncoated cotton | 5.83 | 39.6 |
| A-coated cotton | 6.06 | 38.9 |
| B-uncoated polyester | 6.76 | 16.0 |
| B-coated polyester | 6.90 | 15.5 |
| C-uncoated wool | 3.38 | 118.7 |
| C-coated wool | 3.54 | 108.6 |

Based on these results, it is clear that the invention provides an environmentally friendly vacuum-based process that utilizes solvent-free and water-free monomers and produces high-quality polymer coatings that do not effect the functional porosity of the substrate. The coating process can be implemented in conventional vacuum coating plants and can be combined with in-line plasma treatment and metallization to create unique and high value-added products. The common feature of all embodiments of the invention is coating of the fibers or voids in the porous substrate produced by flash evaporation and radiation curing of a monomer to produce a conforming, thin, polymer layer that functionalizes the surface of a porous material with virtually no effect on its permeability or breathability.

Various tests have shown that the process can be used successfully to functionalize surfaces of woven and non-woven fabrics, paper, membranes and foam substrates. Properties such as oil and water repellency and wettability, release, antibacterial and other chemical functionalities are easily achievable with ultra thin polymer coatings (less than 0.2 µm). Thicker polymer layers, of the order of 0.2–3 µm, have been used to provide thermo-mechanical properties such as heat sealing, abrasion resistance and chemical resistance against moisture, acids, bases and organic solvents. Such thin coatings of multifunctional acrylates, monoacrylates, vinyls, epoxies and various other oligomers can be deposited over a substrate traveling at speeds as high as 1000 ft/min. This high productivity, combined with relatively low monomer material costs, results in a very economical and cost effective functionalization process.

Figure 4:
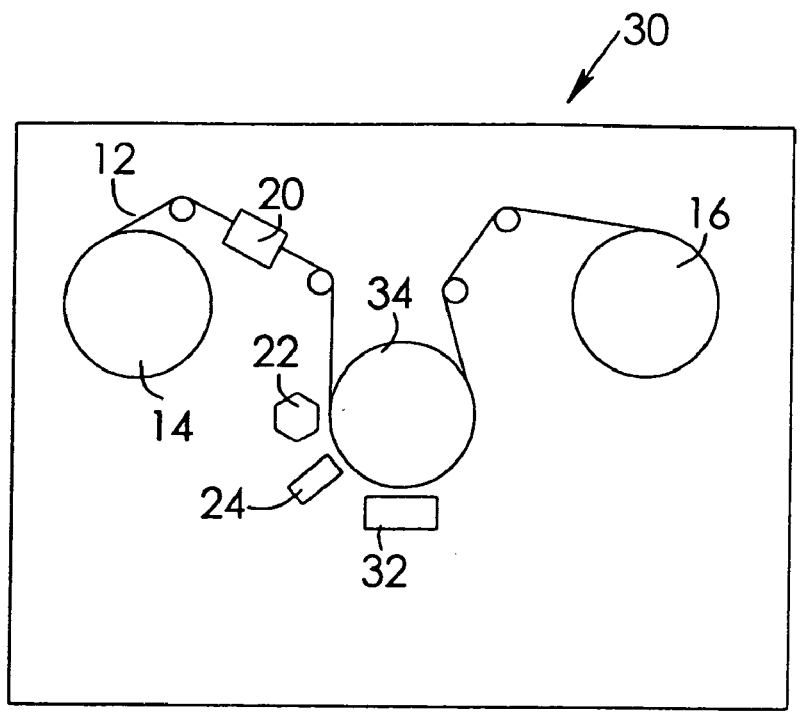
FIG. 4 is a schematic representation of a vacuum chamber equipped with plasma pretreatment, a flash evaporation/condensation station, a monomer radiation-curing station, and a metal or ceramic vapor deposition station for the sequential deposition of multiple layers over a porous substrate according to the invention.
Figure 5:
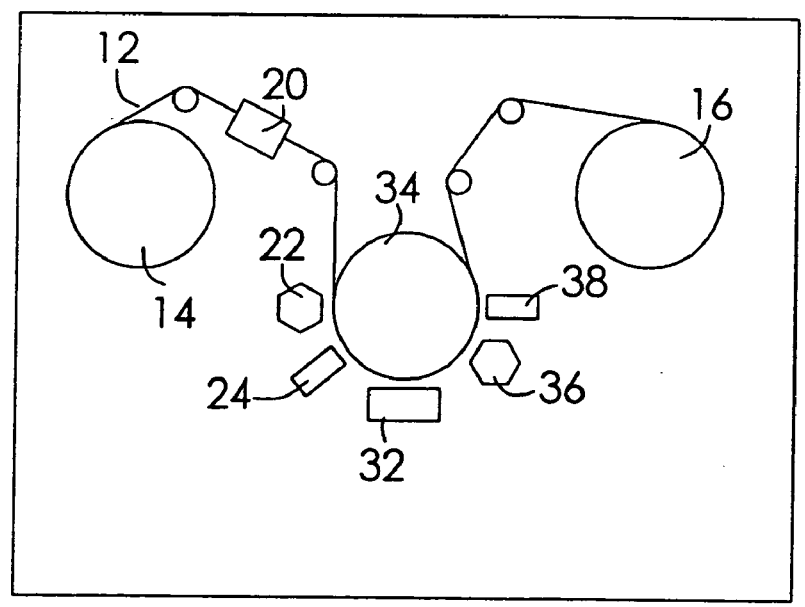
FIG. 5 is a schematic representation of the same chamber of FIG. 4 with an additional in-line vacuum deposition station following the metal/ceramic deposition unit.

When further combined with the vapor deposition of metal and/or ceramic layers, the process of the invention affords improvements in a wide range of multifunctional products. FIG. 4 illustrates schematically a vacuum chamber 30 that includes a station 32 for depositing metals and ceramics (such as a sputtering unit or a reactive electron-beam evaporation unit). Note that in the process illustrated in this figure the porous substrate 12 is chilled by contact with a cold drum 34 for the condensation step. If desirable, additional layers may be deposited sequentially in line by adding further deposition units. For example, a transparent polymer layer may be further used to coat the metal layer already deposited on the fabric (over the initial thin polymer film of the invention) in order to protect the metal and prevent abrasion while retaining the reflectivity of the fabric. In such a case, as shown in FIG. 5, an additional flash evaporation unit 36, followed by a second radiation curing unit 38, would be utilized after the metallization stage.

It is anticipated that such a combination of layers can be used advantageously in the production of a variety of improved products. For example, metallized fabrics are used for decoration and to achieve energy savings in the production of roll, vertical, and horizontal blinds. Similarly, breathable insulation in the form of metallized paper and non-woven polymers is widely used in construction to reflect heat while minimizing the formation of mold and mildew. Metallized fabrics are used to decorate garments and paper for labels. They are also used as clothing liners and in camping gear, such as sleeping bags and tents, to improve insulation without affecting weight and breathability. The same advantages are desirable in blankets and tapes for medical applications, in fire protective suits designed to reflect infrared radiation in a multitude of military applications (jackets, shirts, garments, tents and tarps used to reduce infrared signature), in garments for workers in microwave and radar communication industries, and in clothing for electro-magnetic interference (EMI) testing personnel.

Metallized fabrics are also widely used in the automotive industry to provide engine and exhaust-heat insulation, and filter media (such as functionalized the non-woven polypropylene used to produce electrostatically charged filter systems and air filters with EMI shielding properties). Foams and fabrics are metallized to produce electromagnetic shields for gasket materials, cable shields, covers and liners for motors, avionic boxes, cable junctions, antennas, portable shielded rooms, window drapery, wall coverings and electrostatic dissipating garments. The performance of the porous materials used in all of these applications can be materially improved by the initial deposition of a first thin-film polymer layer according to the present invention.

A great variety of paper, as well as woven and non-woven fabrics, were coated according to the invention with different polymer formulations designed to serve specific applications. The coated materials were subjected to surface microscopic investigation. The data showed in all cases that condensing a flash-evaporated monomer vapor on the plasma pretreated fibers produces a homogeneous thin liquid layer that covers the entire surface of each individual fiber without connecting fiber to fiber and blocking the pores. The following examples illustrate these applications of the invention (all percentages are by weight).

EXAMPLE 1

Hydrophobic/Oleophobic Coating

Figure 6:
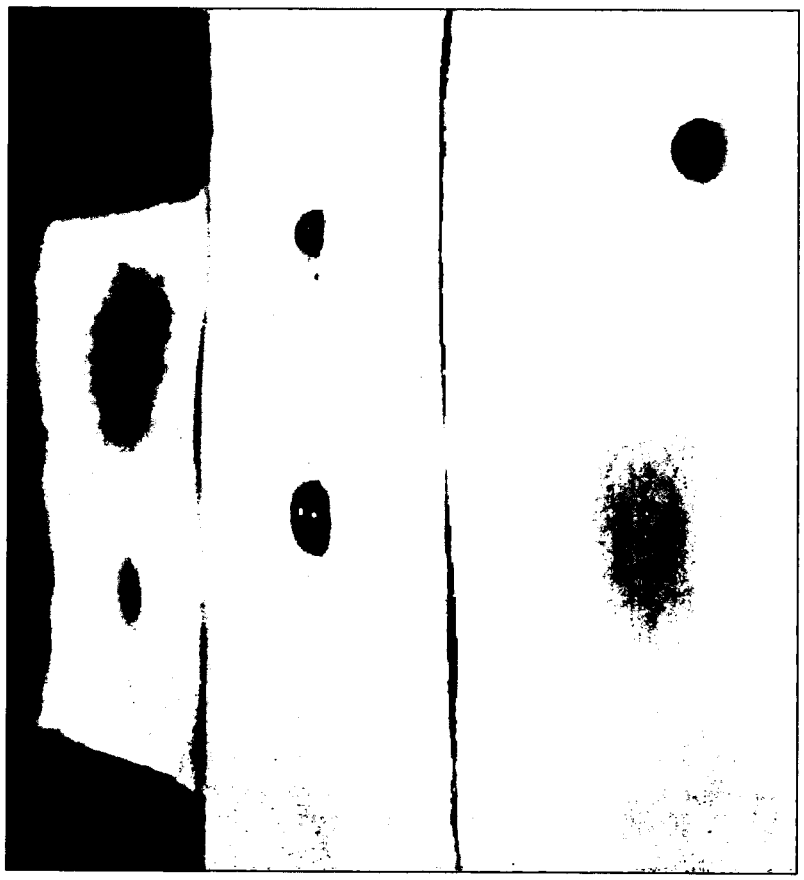
FIG. 6 illustrates the functionalizing properties of the invention on a porous non-woven polypropylene filter medium. The lower portion shows the oleo-philic (left) and hydrophobic (right) properties of the uncoated material. The middle portion shows the medium's oleophobic property acquired after coating with a TEFLON®-like polymer (a fluorinated acrylate). The top portion shows the hydrophilic property acquired after coating with a wetting polymer (a carboxylic acid functionalized acrylate).

A melt-blown polypropylene nonwoven fabric was functionalized with a hydrophobic/oleophobic fluorinated acrylate polymer coating to create a repellent surface. The monomer was flash evaporated at about 100 Millitorr. The fabric was pretreated in a plasma field and within one second it was exposed to the monomer vapor for condensation while traveling at a speed of about 50 meters/minute. The condensed monomer layer was cured in-line by electron beam radiation within 100 milliseconds. A polymer coating thickness of about 0.1 µm resulted from the run, which was found to provide adequate repellency for water and oil with a surface energy of about 27 dyne/cm. The functionalized fabric repelled both water-based and oil-based fluids while substantially retaining the original permeability of the fabric. The coated materials showed high performance as electrostatic charged filter media. The same coating process with the same fluoro-acrylate monomer was repeated on nonwoven polyethylene, paper, fluoro-polymers, polyester fibers, nylon fibers, rayon fibers, wool fabrics, and cotton fabrics. Similar water/oil repellency results were obtained with all kinds of fabric materials where the functionalizing monomer was deposited in thicknesses ranging from 0.02 to 3.0 µm. In addition to water and oil repellency, the coated materials showed a lower coefficient of friction, which produced a silky feel in the coated fabrics. In a similar experiment at a higher speed (200 meter/minute), the functionalized coating was restricted to the exposed surface of the fabric material. The back side of the coated web retained its original properties. (It is noted that the option of selectively coating only one side of the web is another unique characteristic for the process of the invention.) As illustrated in FIG. 6 (left-center side), these coating formulations produced the desired repellent characteristics in these fabrics without loss oil repellency properties of the treated fabric remained substantially unaltered after 10 wash cycles.

TABLE 2

Durability of Water and Oil Repellent Fluoro-Polymer Coatings

| Fabrics | Samples | Water/Alcohol Repellency Test* | | Oil Repellency Test* | |
|---|---|---|---|---|---|
| | | Un-washed | 10 Wash cycles | Un-washed | 10 Wash cycles |
| Cotton | Uncoated | 1 | 1 | 1 | 1 |
| | Coated | 6 | 4 | 5 | 3 |
| Polyester | Uncoated | 3 | 3 | 1 | 1 |
| | Coated | 6 | 5 | 6 | 4 |
| Nylon | | | | | |
| | Uncoated | 3 | 3 | 1 | 1 |
| | Coated | 6 | 5 | 6 | 4 |

*Number 1 is the lowest repellency and 6 is the highest.

EXAMPLE 2

Hydrophilic Coating

A melt-blown polypropylene nonwoven fabric was coated with a hydrophilic acrylate polymer film functionalized with hydroxyl, carboxyl, sulfonic, amino, amido and ether groups (in separate tests) to create a water absorbent surface. The monomer was flash evaporated at about 10 Millitorr. The fabric was pretreated in a plasma field and within one second it was exposed to the monomer vapor for condensation while traveling at a speed of about 30 meters/minute. The condensed monomer layer was cured in-line by electron beam radiation within 150 milliseconds. A polymer coating thickness of about 0.1 µm resulted from the run, which was found to provide adequate wettability in all cases by water with a surface energy of about 70–72 dyne/cm. The functionalized fabrics absorbed water while substantially retaining the original permeability of the fabrics. The coated materials showed high performance as water absorbent media. The same coating process with the same hydrophilic acrylate monomers was repeated on nonwoven polyethylene, fluoropolymers, polyester fibers and fluoropolymer fabrics. Similar results were obtained with all kinds of fabric materials with monomer layers ranging from 0.1 to 3.0 µm. In a similar experiment at a higher speed (200 meter/minute), the functionalized coating was restricted to the exposed surface of the fabric material. The back side of the coated web kept its original properties. FIG. 6 illustrates water tests on the surface of a non-woven polypropylene filter medium used in the examples, before and after coating, as detailed above. Before coating, the material was hydrophobic, as seen at the bottom-right portion of the picture. After functionalization according to the invention, the material became clearly hydrophilic, as illustrated at the top-right portion of the picture by the water drop absorbed into the fabric. Thus, these coated substrates can be used advantageously for diapers, filters, battery separators and ion transport membranes. Table 3 below shows three water-strike tests for non-woven polypropylene coated with two hydrophilic acrylate-based formulations (Sigma 1033 and Sigma 1032 coatings). Filter paper, which is known to be highly absorbing, was used as the reference control material (because untreated diaper material—polypropylene—is known to be hydrophobic).

TABLE 3

Water strike test for non-woven polypropylene (NW PP).

| Material | Time in seconds required for complete absorption of a ten-gram portion of DI water | | | |
| --- | --- | --- | --- | --- |
| | 1st strike | 2nd strike | 3rd strike | Average time |
| Uncoated NW PP | 89.36 | 64.36 | 65.92 | 73.21 |
| Filter paper control | 3.15 | 6.98 | 7.35 | 5.83 |
| 1033 coating on PP | 4.71 | 6.29 | 5.99 | 5.66 |
| 1032 coating on PP | 2.7 | 6.77 | 7.05 | 5.51 |

Note that coated polypropylene is as effective as the highly absorbing filter paper.

EXAMPLE 3

Hydrophobic/Oleophobic Colored Coating

The same experiment as in Example 1 was repeated with 3–5% organic dyes (e.g., disperse red) mixed in the fluorinated acrylate monomer. The coated substrates showed the same levels of water and oil repellency, measured at about 6 and 5 on the Dupont® Teflon® Repellency Test, respectively, with the color added to the coating. The intensity of the color can be controlled by monitoring either the amount of organic dye or the thickness of the coating.

EXAMPLE 4

Hydrophilic Colored Coating

The same experiment as in Example 2 was repeated with 3–5% organic dyes (e.g., Malachite green) mixed in the hydrophilic acrylate monomer. The coated substrates showed a colored surface with comparably high water absorption.

EXAMPLE 5

Hydrophobic/Oleophobic Biocide Coating

The same experiment as in Example 1 was repeated with 2–4% organic antibacterial additive (e.g., chlorinated aromatic compound) in the fluorinated acrylate monomer. The coated substrates showed water and oil repellency with antibacterial properties as indicated below.

| | Results (Zone Size) | |
| --- | --- | --- |
| Sample identification | *Staphylococcus* (13 mm) | *Klebsiella Pneumoniae* (13 mm) |
| Control uncoated paper | no inhibition to growth | no inhibition to growth |
| Both side Coated paper | complete inhibition | complete inhibition |

EXAMPLE 6

Hydrophilic Biocide Coating

The same experiment as in Example 2 was repeated with 3–5% organic antibacterial additive (e.g., chlorinated aromatic compound) in the hydrophilic acrylate monomer. The coated substrates showed antibacterial properties and high water absorption.

EXAMPLE 7

Fire Retardant Coatings

The same experiments as in Example 1 and 2 were repeated with 5–20% brominated compound in the diacrylate monomer. The coated substrates showed fire resistance properties with hydrophobic/oleophobic and hydrophilic properties comparable to those of Examples 1 and 2.

EXAMPLE 8

Color Changing Sensing Coatings

The same experiments as in Example 1 and 2 were repeated with 5–20% of a pH indicator compound, such as phenol phthaleine, in the diacrylate monomer. The resulting coated substrates changed color reversibly with corresponding changes in the environment's pH. The same experiments were repeated using 5–30% heat-sensitive molecules, such as 4-pentyl-4-cyanobiphenyl, which produces a change in color from clear to grey when the temperature reaches about 50 degrees C. The coated materials changed color with changes in the temperature of the environment.

EXAMPLE 9

Flavored Coatings

The same experiments as in Example 1 and 2 were repeated with 5–20% artificial fruit-flavor compounds in the diacrylate monomer; for example, an ionone such as 4-(2,6,6-trimethyl-1-cyclohexen-1-yl)-3-buten-2-one is used to confer a strawberry. The coated substrates exhibited a corresponding emission of a fruity scent in addition to hydrophobic/oleophobic and hydrophilic properties comparable to those of Examples 1 and 2.

EXAMPLE 10

Wet Tensile Strength Coatings

The same experiments as in Example 1 and 2 were repeated at a slower rate (<100 fpm) to allow the monomer vapor to penetrate all the way through the fibers of paper material and coat the entire available surface of individual fibers (retaining the porosity if the material). The resulting coated paper exhibited a high wet tensile strength in addition to hydrophobic/oleophobic and hydrophilic properties comparable to those of Examples 1 and 2.

EXAMPLE 11

Chemical Resistant Coatings

The same experiments as in Example 1 and 2 were repeated with a monomer that contained 5–40% triacrylate monomer in order to increase cross-linking and the density of the coating, thereby increase it chemical resistance. The coated substrates showed that the addition of the triacrylate monomer increased the chemical resistance to organic solvents as well as acid and base solutions while retaining hydrophobic/oleophobic and hydrophilic properties comparable to those of Examples 1 and 2.

EXAMPLE 12

Metal Chelating Coatings

The same experiments as in Example 2 were repeated with 10–20% acrylated acetyl acetonate monomer in the diacrylate monomer. The coated substrates showed metal chelating properties by bonding to metal ions (e.g., Cu, Pb, Cr). Accordingly, they were tested successfully as filters for removing metal ions from water.

EXAMPLE 13

Proton Conductor Coatings

As in the previous examples, porous polypropylene and fluoropolymer films were coated with a sulfonated compound monomer and then cured with an electron beam. The coated substrates exhibited proton conductivity, thereby showing potential for use as a fuel-cell membrane.

EXAMPLE 14

Ion Conductor Coatings

As in the previous examples, porous polypropylene and fluoropolymer films were coated with a sulfonated compound that was co-deposited with metallic lithium to form lithium sulfonate and then cured with an electron beam. The coated substrates exhibited lithium-ion conductivity, thereby showing potential for use as a battery separator and electrolyte.

In addition to the foregoing examples, the ability to deposit a polymer layer followed by metallization in line, as illustrated in FIG. 5, offers some unique opportunities in the production of metallized fabrics and paper. A top thin polymer layer can provide abrasion and corrosion protection which is a basic requirement for most metallized layers. For example, we have shown that the washability of metallized fabrics can be prolonged significantly when coated with a vacuum deposited acrylate layer that has a thickness of about 1.0 μm. Such thin polymer layers have no practical effect on the fabric breathability and "comfort" properties. Similarly, metallized fabrics for heat reflecting applications can be protected with thin polymer layers that have low infrared absorption in order to minimize heat absorption upon exposure to high temperatures (low emissivity). Other functionalizing polymer properties include controlling the surface energy, which may be varied from high surface energy for improved adhesion and wettability of the metallized material to low surface energy for release applications and Teflon®-like performance.

As illustrated by the examples above, coating formulations have also been effectively functionalized with biocide compounds, such as chlorinated molecules. A small amount of biocide is evaporated simultaneously with the acrylate monomer and becomes trapped in the matrix of the radiation cured host polymer. Such coatings have been successfully deposited directly on fabric substrates or over other polymer, metal or ceramic films. Colored decorative coatings were similarly prepared and applied by synthesizing functionalized organic dyes formulated in a binder and applying them to white paper and non-woven webs.

This invention demonstrates that porous materials may be functionalized by monomer vacuum deposition to produce desired surface properties without significant loss of the original characteristics of the substrate. Thus, vacuum deposited polymer coatings on fabric and paper webs provide a real alternative to conventional solvent- and water-based coating processes. Highly functional coatings can be obtained that conformally coat the fibers of these materials with little or no effect on porosity and gas or liquid permeation. Coatings with submicron thickness can be used to replace liquid-based fluoro treatments and wax impregnation processes, which are facing environmental and recycleability challenges. The totally enclosed conditions of a vacuum chamber are environmentally friendly, permitting fluoro, chloro and other hazardous-monomer formulations to be processed safely.

Figure 7:
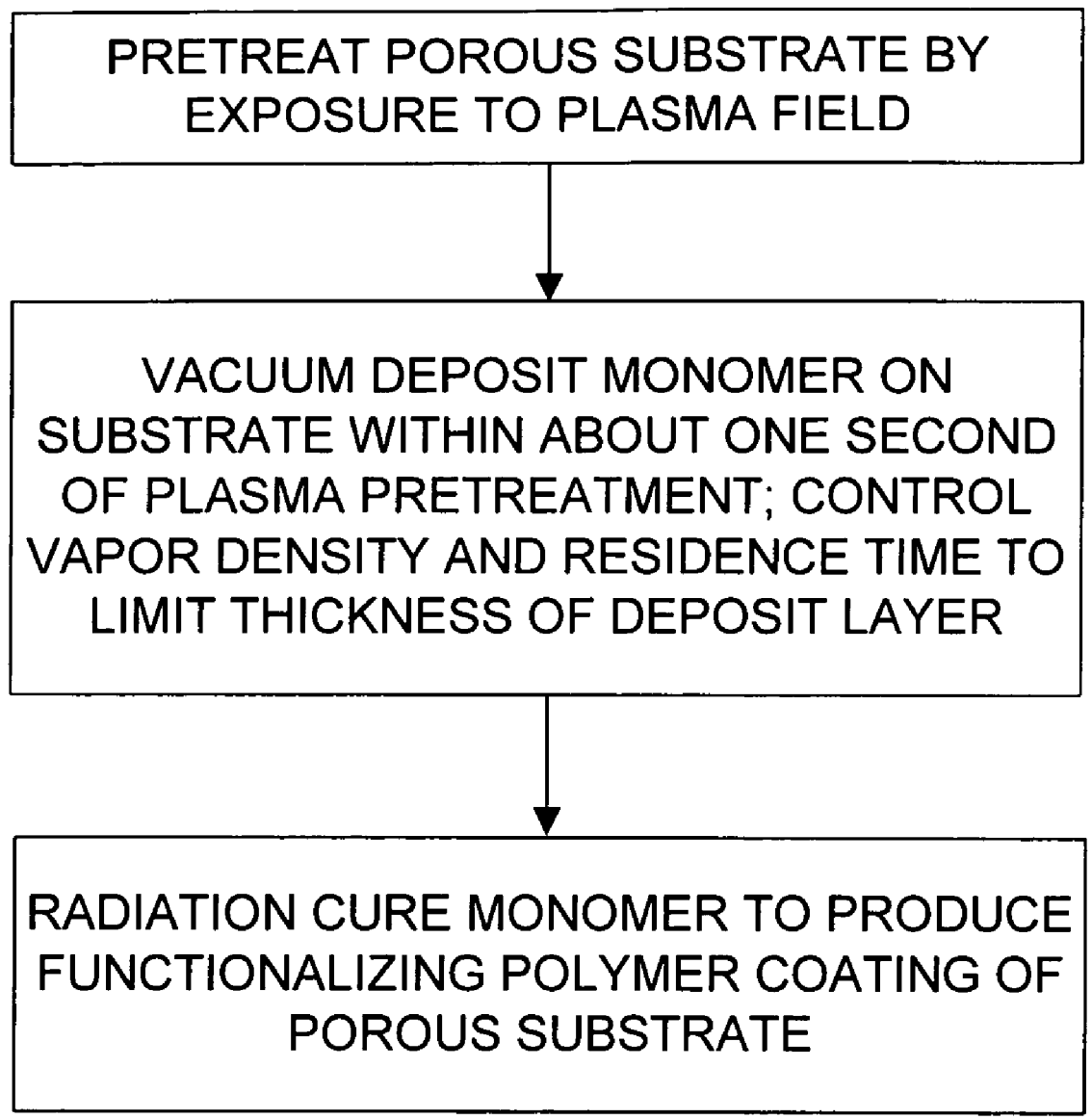
FIG. 7 is a flow chart of the basic steps of the process of the invention.
Figure 8:
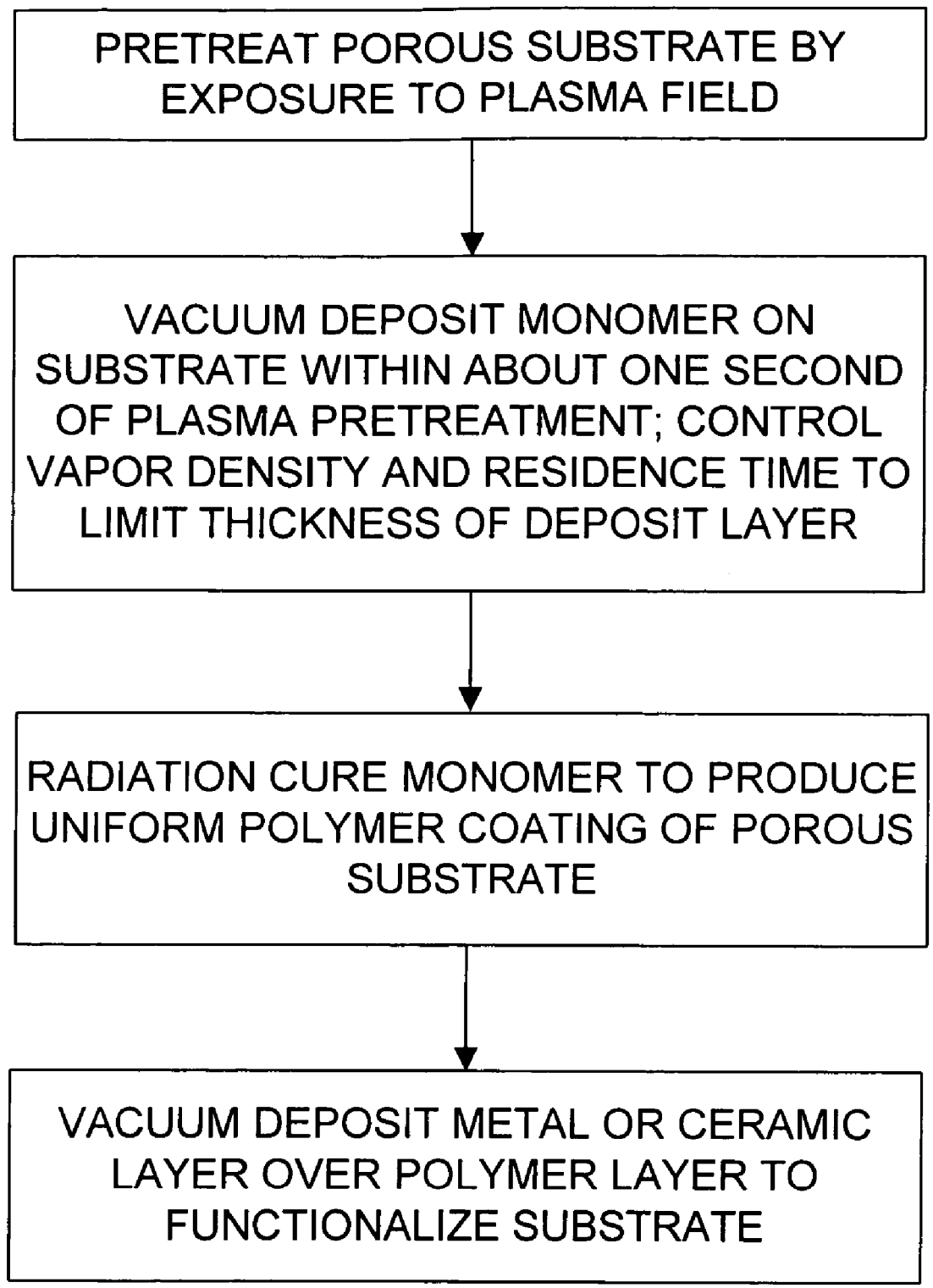
FIG. 8 is a flow chart of the steps involved in a second embodiment of the invention.
Figure 9:
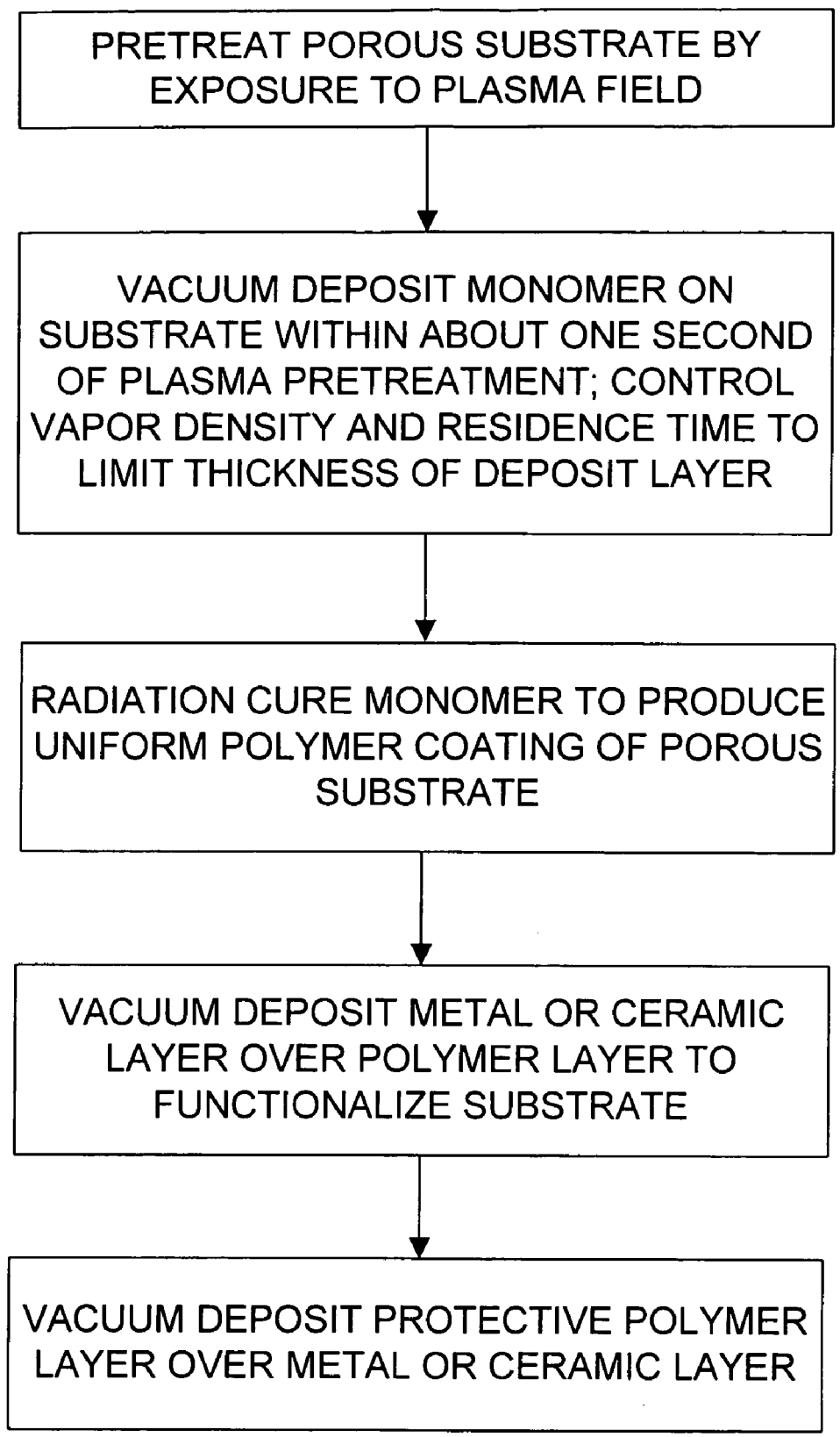
FIG. 9 is a flow chart of the steps involved in a third embodiment of the invention.

FIGS. 7, 8 and 9 are flow charts illustrating the basic steps of the preferred embodiments of the invention for single, double and triple layer applications, respectively. Various changes in the details, steps and components that have been described may be made by those skilled in the art within the principles and scope of the invention herein illustrated and defined in the appended claims. For example, while the invention has been described mainly in terms of one-side coating, it is clear that the two sides of a sheet-type substrate may be coated separately or on line to produce different functionalities. For example, diaper material may be functionalized to improve hydrophilicity on one side and produce hydrophobicity on the opposite side, thereby producing a diaper that is highly absorbent in the interior and repellent in the exterior, as desirable for most uses.

Thus, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A process for functionalizing a porous substrate with permeable pore walls to impart a particular functionality to the substrate while retaining its permeability, comprising the following steps:
   (a) pretreating said substrate in a plasma field;
   (b) flash evaporating a monomer having said functionality in a vacuum chamber to produce a vapor;
   (c) condensing the vapor on the porous substrate within about one second of the pretreating step to produce a film of said monomer coating the pore walls of the porous substrate; and
   (d) curing the film to produce a functionalized polymeric layer the pore walls of the porous substrate;
   wherein said condensing step is carried out under vapor-density and residence-time conditions that limit said polymeric layer to a maximum thickness of about 3.0 µm.

2. The process of claim 1, further including the step of vacuum depositing an inorganic layer over said polymeric layer.

3. The process of claim 2, wherein said inorganic layer is selected from the group consisting of metals and ceramics.

4. The process of claim 3, further including the steps of flash evaporating and condensing a second film of monomer on said inorganic layer, and the further step of curing the second film to produce a second polymeric layer on the inorganic layer.

5. The process of claim 2, further including the steps of flash evaporating and condensing a second film of monomer on said inorganic layer, and the further step of curing the second film to produce a second polymeric layer on the inorganic layer.

6. The process of claim 5, wherein said porous substrate comprises a porous material selected from the group consisting of polypropylene, polyethylene, fluoro-polymers, polyester, nylon, rayon, paper, wool, cotton, glass fibers, carbon fibers, cellulose based fibers and metals; and said metal layer is selected so as to provide a predetermined level of emissivity.

7. The process of claim 2, wherein said porous substrate comprises a porous material selected from the group consisting of polypropylene, polyethylene, fluoro-polymers, polyester, nylon, rayon, paper, wool, cotton, glass fibers, carbon fibers, cellulose-based fibers and metals; and said metal layer is selected so as to provide a predetermined level of emissivity.

8. The process of claim 1, wherein said porous substrate comprises a porous material selected from the group consisting of polypropylene, polyethylene, fluoro-polymers, polyester, nylon, rayon, paper, wool, cotton, glass fibers, carbon fibers, cellulose-based fibers, and metals; and said monomer is a fluorinated monomer to provide a water and oil repellency functionality.

9. The process of claim 8, wherein said monomer comprises a color additive.

10. The process of claim 8, wherein said monomer comprises a biocide additive.

11. The process of claim 8, wherein said monomer comprises a brominated monomer to provide a fire retardant functionality.

12. The process of claim 1, wherein said porous substrate comprises a porous material selected from the group consisting of polypropylene, polyethylene, polyester, nylon, rayon, paper, cotton, wool, glass fibers, carbon fibers, cellulose-based fibers, and metals; and said monomer is functionalized with a functional group selected from the group of hydroxyl, carboxyl, sulfonic, amino, arnido, or ether to provide a hydrophilic functionality.

13. The process of claim 12, wherein said monomer comprises a color additive.

14. The process of claim 12, wherein said monomer comprises an biocide additive.

15. The process of claim 12, wherein said monomer comprises a brominated material to provide a fire-retardant functionality.

16. The process of claim 12, wherein said monomer comprises an acrylated acetyl acetonate monomer to provide a metal-chelating functionality.

17. The process of claim 1, wherein said porous substrate comprises a porous material selected from the group consisting of polypropylene, polyethylene, fluoro-polymers, polyester, nylon, rayon, paper, cotton, wool, glass fibers, carbon fibers, cellulose-based fibers and metals; and said monomer includes a sulfonic acid group to provide a proton-conductivity functionality.

18. The process of claim 1, wherein said porous substrate comprises a porous material selected from the group consisting of polypropylene, polyethylene, fluoro-polymers, polyester, nyLon, rayon, paper, wool, cotton, glass fibers, carbon fibers, cellulose based fibers, and metals; said monomer includes a sulfonic acid group; and further comprising the step of co-depositing metallic lithium over said monomer prior to the curing step to provide a polymer electrolyte with ion-conductivity functionality.

* * * * *